United States Patent
Maletin et al.

(10) Patent No.: US 6,602,742 B2
(45) Date of Patent: Aug. 5, 2003

(54) SUPERCAPACITOR AND A METHOD OF MANUFACTURING SUCH A SUPERCAPACITOR

(75) Inventors: Yurii Maletin, Kiev (UA); Natalie Strizhakova, Kiev (UA); Sergey Kozachkov, Kiev (UA); Antonina Mironova, Kiev (UA); Sergey Podmogilny, Kiev (UA); Valerii Danilin, Kiev (UA); Julia Kolotilova, Kiev (UA); Volodymyz Izotov, Kiev (UA); Jan Cederström, Saltsjo-Boo (SE); Sergey Gordeev Konstantinovich, St. Petersburg (RU); Julia Kukushkina Aleksandrovna, St. Petersburg (RU); Vasilii Sokolov Vasilevitj, St. Petersburg (RU); Alexander Kravehik Efimovitj, St. Petersburg (RU); Anti Perkson, Tartu (EE); Mati Arulepp, Tartu (EE); Jaan Leis, Tartu (EE); Clarence L. Wallace, Del Mar, CA (US); Jie Zheng, Solna (SE)

(73) Assignee: FOC Frankenburg Oil Company Est., Lichtenstein ( * ) Notice: Subject to any disclaimer, the term of this patent is extended or adjusted under 35 U.S.C. 154(b) by 0 days.

(21) Appl. No.: 09/986,569

(22) Filed: Nov. 9, 2001

(65) Prior Publication Data

US 2002/0097549 A1 Jul. 25, 2002

Related U.S. Application Data

(60) Provisional application No. 60/247,593, filed on Nov. 9, 2000.

(30) Foreign Application Priority Data

Jun. 15, 2001 (RU) ........................ 20011177550

(51) Int. Cl.$^7$ ............................. H01L 21/335

(52) U.S. Cl. ................ 438/142; 438/166; 438/308; 361/321.4; 361/502

(58) Field of Search ................. 438/142, 308, 438/166; 367/502, 321.4

(56) References Cited

U.S. PATENT DOCUMENTS

| | | | |
|---|---|---|---|
| 5,142,451 A | * | 8/1992 | Kurabayashi et al. ....... 361/502 |
| 5,150,283 A | * | 9/1992 | Yoshida et al. ............ 361/502 |
| 5,742,472 A | * | 4/1998 | Lee et al. ................ 361/321.4 |
| 6,323,072 B1 | * | 11/2001 | Yamazaki et al. .......... 438/166 |

FOREIGN PATENT DOCUMENTS

| | | |
|---|---|---|
| EP | 0 712 143 A2 | 5/1996 |
| WO | 97/20333 | 6/1997 |
| WO | 98/54111 | 12/1998 |
| WO | 00/02215 | 1/2000 |

OTHER PUBLICATIONS

Deyang Qu et al., "Studies of Activated Carbons used in Double–Layer Capacitors," Journal of Power Sources, V. 74, 1998, pp. 99–107.

* cited by examiner

*Primary Examiner*—Richard Elms
*Assistant Examiner*—Pho Luu
(74) *Attorney, Agent, or Firm*—Young & Thompson

(57) ABSTRACT

An electric double layer capacitor including at least one pair of polarizable electrodes connected to current collectors, a separator made of ion-permeable but electron-insulating material interposed between the electrodes in each pair of electrodes, and a liquid electrolyte. According to the invention the electrodes include a layer of carbon particles having a narrow distribution of nanopores therein, the pore sizes of the nanopores being adapted to fit the ion sizes of the electrolyte. The invention also relates to a method of manufacturing such a supercapacitor.

13 Claims, 4 Drawing Sheets

SUPERCAPACITOR AND A METHOD OF MANUFACTURING SUCH A SUPERCAPACITOR

FIELD OF THE INVENTION

This invention relates in general to the field of supercapacitors. More particularly, this invention relates to a superior supercapacitor having electrodes fabricated from specially synthesized nanostructured carbon (SNC) powders in which the pore sizes and the specific surface may be selectively controlled.

BACKGROUND OF THE INVENTION

Electric double layer capacitors are widely used in a variety of industries. For example, PCT WO99/24995 shows an electric double layer capacitor and manufacturing method. The electric double layer capacitor comprises metal foil or mesh current collectors, polarizable electrodes made of an activated carbon and a polymer binder, conductive coatings comprising a melamine resin binder at the interfaces between current collectors and polarizable electrodes, and non-aqueous electrolyte. The thickness of the polarizable electrodes is 15 micron. The electrodes were deposited into the conductive layer coated current collector by a screen printing method. Such a electric double layer capacitor demonstrates long term low impedance at the electrode-current collector interface and high power capabilities.

Another prior art capacitor is described in U.S. Pat. No. 5,150,283, showing an electric double layer capacitor and method for producing the same. The method includes depositing a mixture prepared by dispersing activated carbon powder and agent for improving the electric conductivity of the layer on an aluminum substrate by either means of spreading, impregnating or printing. The layer thickness is equal to 50–100 micron.

U.S. Pat. No. 5,776,633 describes carbon/carbon composite materials and use thereof in electrochemical cells. This invention provides an activated carbon fabric impregnated with a mixture of activated carbon powder and binder; the thickness of materials obtained being 125–250 micron. The advantage of materials obtained includes the low resistivity, the ability to easily form thin composites with very good mechanical strength.

Another example of an electric double layer capacitor is described in U.S. Pat. No. 5,142,451. Specifically, an electric double layer capacitor which comprises a plurality of thin plate-like electrode elements is disclosed. The polarizable electrodes were manufactured by sintering powder of minute active carbon particles having an average diameter of about 20 micron into a porous sintered electrode body. This polarizable electrode is held in contact with a current collector through an electrically conductive layer to reduce the inner resistance of the capacitor.

A method for manufacturing a polarizable electrode for electric double layer capacitor is taught in U.S. Pat. No. 5,277,729. The thickness of electrode is about 40–500 micron. The electrode is obtained by hot rolling an initial mixture of fine carbon powder, polymer resin and liquid lubricant.

A metal electrode material, capacitor using metal electrode material, and method of manufacture is disclosed in PCT WO 99/38177. The metal electrode material comprises a "valve metal material" with carbon particles on its surface. The metal electrode material is coated with an activated carbon layer and used as polarizable electrode for an electric double layer capacitor. That capacitor has reduced inner resistance, resulting in an increase in capacitance.

U.S. Pat. No. 5,742,474 describes an electric double layer capacitor, comprising a pair of polarized electrodes made of the same activated carbon materials. However, the amount of the carbon material of the polarized positive electrode is higher than that of the polarized negative electrode. The main advantage is that it is possible to increase a voltage applied to the electric double layer capacitor.

The vast majority of carbon materials used for electrodes in electric double layer capacitors (EDLC) have been prepared by the charring or carbonization of organic substances, usually followed by a surface activation process using water vapor or other activation agent.

The foregoing demonstrates that electrodes and capacitors have been widely studied in the prior art. Yet with all of this study, there is still a great need for the development of supercapacitors that exhibit superior performance.

DEFINITIONS

For the purpose of this patent application, the terms nanoporous, nanoporosity and nanostructured apply to pore sizes less than 3 nanometer. By transport porosity is meant pores larger than 3 nanometers.

SUMMARY OF THE INVENTION

In summary, an object of the present invention is to provide a supercapacitor, which exhibits superior performance. In particular, the present invention provides the following features. Specially synthesized nanostructured carbon (SNC) powder is processed to fabricate electrodes in such a manner that the resultant electrodes have pore sizes, which are selectively and closely controlled. Further, thin, composite aluminum and SNC electrodes are made using the carbon powder. Additionally, by the ability to selectively control the resultant pore sizes in the electrodes, a capacitor is provided wherein the positive and negative electrodes are balanced with respect to their nanopore size and active carbon content, thereby tailoring the electrodes to fit the ionic sizes of the electrolyte positive and negative ions respectively employed with the capacitor. This also allows, in another aspect of the present invention, the selection of the most efficient electrolyte with respect to its conductivity and other desirable features. The present invention also provides for the selection of a desirable separator, which gives increased conductivity and leaves sufficient free ion concentration when charged.

In another aspect of the present invention, a method is provided wherein SNC is synthesized from inorganic polycrystalline material to selectively control the pore size and pore size distribution in the resulting electrode.

In one embodiment, an electric double layer capacitor is provided comprising: at least two thin and flexible polarizable electrodes obtained by rolling a mixture of SNC material with a binder. Said electrodes are connected to metal current collectors; a thin layer of a porous, ion-permeable but electron-insulating material (separator) interposed between electrodes; and a liquid electrolyte.

In another embodiment, an electric double layer capacitor is provided comprising: a pair o f polarizable electrodes made of a SNC material having different porosities (and pore size distributions); a thin layer of a porous, ion-permeable but electron-insulating material (separator) interposed between the electrodes; and a liquid electrolyte.

BRIEF DESCRIPTION OF THE TABLES AND FIGURES

TABLE 1 is a table showing pore structure parameters for SNC(SiC) powder modified by $HNO_3$.

TABLE 2 is a comparison of electrochemical behaviour of non-modified and modified SNC materials.

TABLE 3 shows properties of modified nanostructured carbon from different precursors.

TABLE 4 gives electrochemical characteristics of some compounds selected as voltage equalizing additives.

TABLE 5 illustrates the influence of carbon material from various precursor material on capacitance in electric double layer capacitors with water based electrolyte systems.

TABLE 6 shows results of different methods of connecting an aluminum current collector to a carbonaceous electrode sheet.

TABLE 7 is a rendering of the effect of balancing positively and negatively charged polarizable electrodes.

TABLE 8 gives examples of electrochemical performance of prototype electric double layer capacitors according to the present invention.

Figure 5:
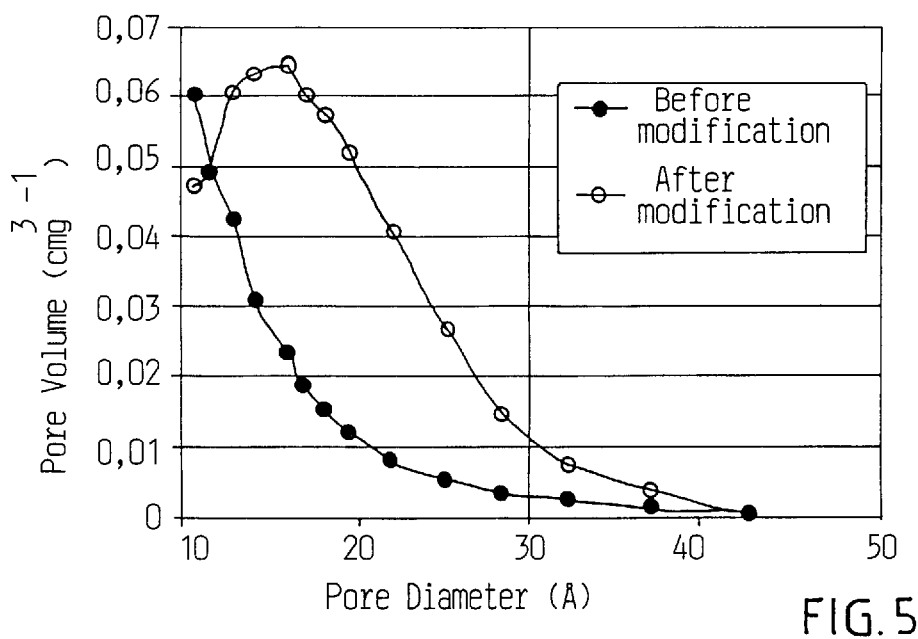
Figure 6:
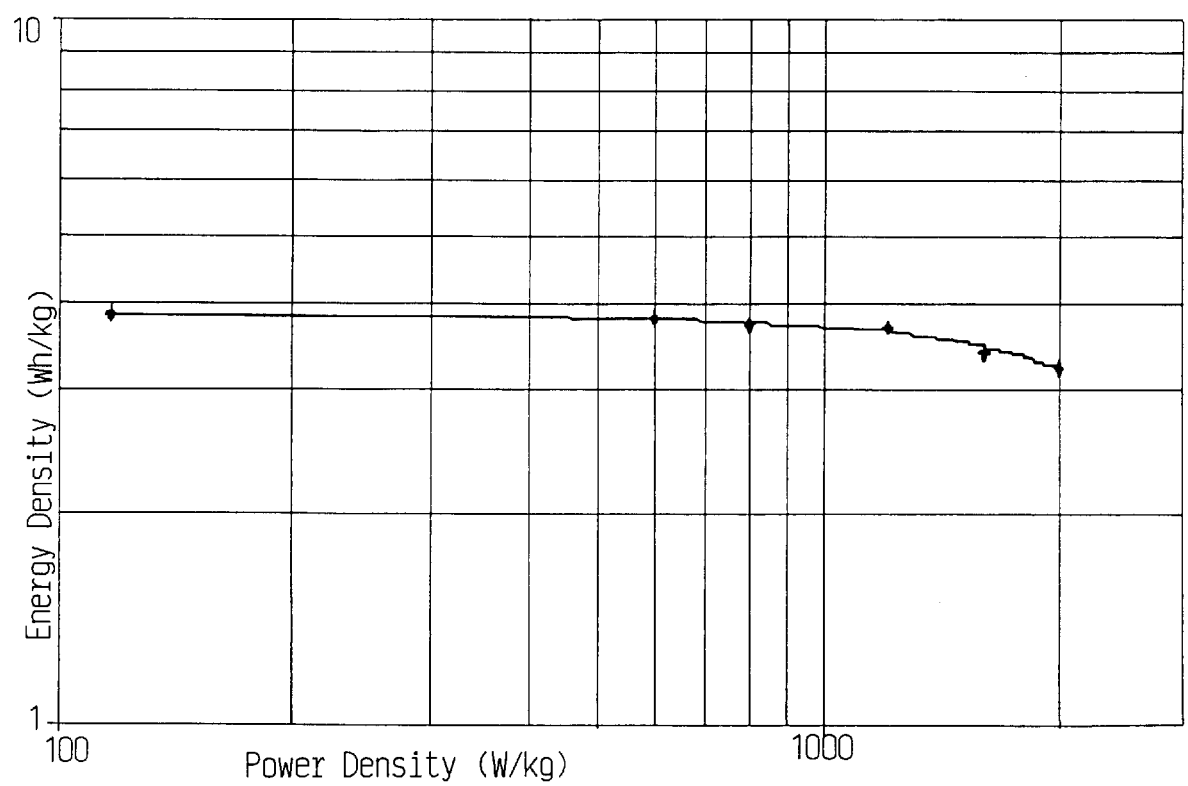

FIG. 5 compares the pore size distribution of carbon powders from TiC before and after modification FIG. 6 is a Ragone plot of specific energy and specific power of an unpacked electrochemical system of device numbe 1 in table 8.

Figure 7:
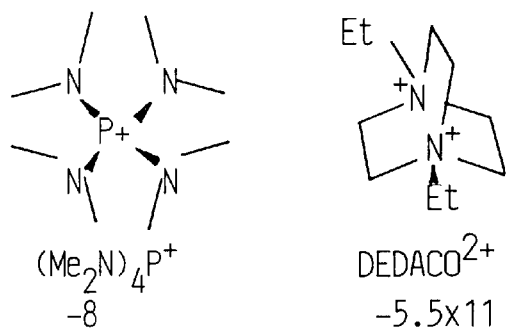
Figure 7:
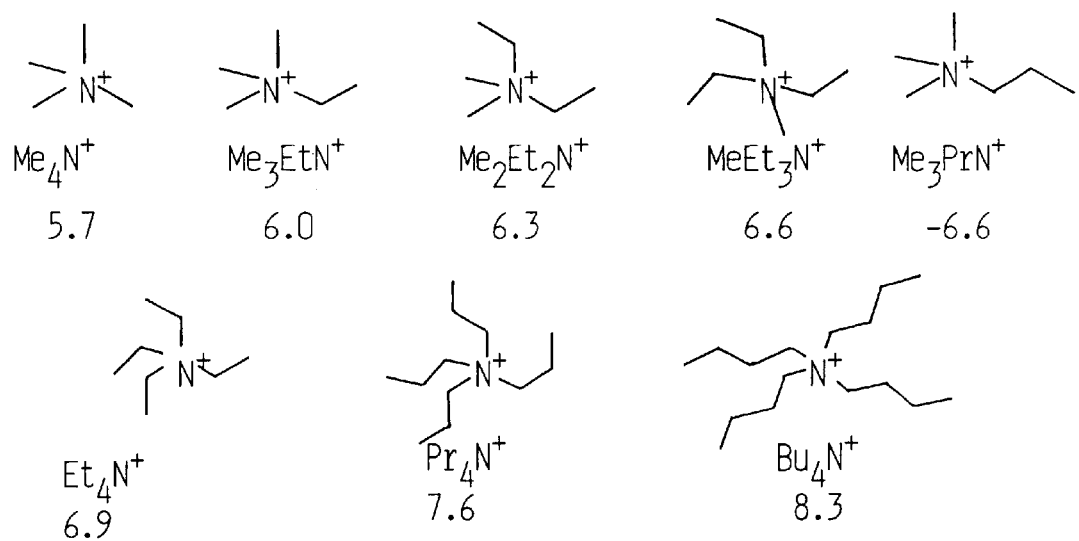

FIG. 7 shows some electrolytic salts (cation and anions) used in electrolytes for electric double layer capacitors.

DETAILED DESCRIPTION OF THE INVENTION

Figure 1:
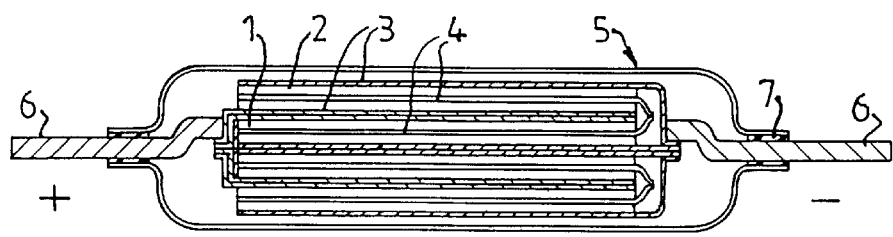
FIG. 1 is s schematic drawing of supercapacitor device comprising 4 anodes and 4 cathodes connected in parallel according to the present invention.

The invention will now be described in more detail with reference to exemplifying embodiments thereof and also with reference to the accompanying
drawings of which FIG. 1 illustrates a side view of a capacitor with 4 anodes and 4 cathodes connected in parallell in accordance with the present invention. The capacitor with double electric layers generally includes a hermetic case 5, closed by a sealing 7. Inside of the case are situated one or more electrode pairs of which 1 is the anode and 2 is the cathode. The electrodes 1 and 2 are saturated with an electrolyte and separated by means of a porous separator 4. To the electrodes 1 and 2 are attached metal current collerctors 3 which are in turn joined to a terminal lead 6.

The present invention provides in one aspect SNC powder uniquely manufactured with closely controlled pore sizes. SNC powder is processed to fabricate electrodes in such a manner that the resultant electrode has pore sizes which are selectively and closely controlled. Further, thin electrodes are made using the carbon powder. In another aspect of the present invention by selectively controlling the resultant pore size in the electrodes, a capacitor is provided wherein the positive and negative electrodes are balanced with respect to their nanopore size and active carbon content. This allows one to tailor the electrodes to fit the ionic sizes of the positive and negative electrolyte ions employed with the capacitor. This also provides, in another aspect of the present invention, the selection of the most efficient electrolyte with respect to its conductivity and other desirable features. In yet another aspect of the present invention, the selection of a desirable separator is provided, which possesses desirable ionic conductivity and leaves sufficient free ion concentration when charged.

Additionally, a method is provided wherein SNC is synthesized to selectively control the pore size and pore size distribution in the resulting electrode. Finally, a post treatment of the nanoporous carbon material for fine tuning of the pore size and its distribution is introduced.

More particularly, SNC materials are produced by thermo-chemical treatment of carbides or related carbon-containing compounds. The choice of carbon containing compound and respective synthesis conditions controls the size of nanopores and the extent of the active surface area. The ability to control the pore size and porosity is required to match the ion sizes in different electrolytes used in the supercapacitor application.

Process for a preparation of mineral active carbons from metal or metalloid carbides and some carbonitrides is described in GB 971943 that was focused on producing activated carbon powders, which would have superior adsorption behaviors. Major difference of the present invention from the prior art mentioned above is to provide the carbonaceous material for electric double layer capacitors having large capacitance per volume and low electrical resistivity. These targets are achievable by a material of high density in the sense that no wasteful porosity occurs. Another aspect of this invention is to provide the process for producing such a carbonaceous material.

There is a large range of possible carbon containing precursor compounds of the general formula MCON, where M is a metal, C is carbon, O is oxygen and N is nitrogen. Some of these compounds are more suitable to our process than others. For example if M is a transition metal such as Titanium, then the simplest compound is TiCx where x is in the range of about 0.5–1. For TiC, the pore size of the resulting carbon has been measured to have a peak value of about 0.6–0.8 nm. For TiC$_{0.5}$ the peak pore size of the resulting carbon is approximately 2.8 nm. The control of C sub-stoichiometry offers a method to control the nanopore size resulting from halogenation. Substituting O and N for carbon in TiCx can further lower the total carbon content of the precursor compound. This gives a further possibility to widen and control the total porosity and range of pore sizes. Substitutions for Titanium such as with Molybdenum may also be made. In this case the Mo atoms substitute for Ti in the same sintered metal lattice to form a solid solution compound such as (TiMo)Cx. Upon halogenation, such a solid solution yields a carbon with a nanopore size and distribution, which differs beneficially from that of TiCx or MoCx.

Figure 2:
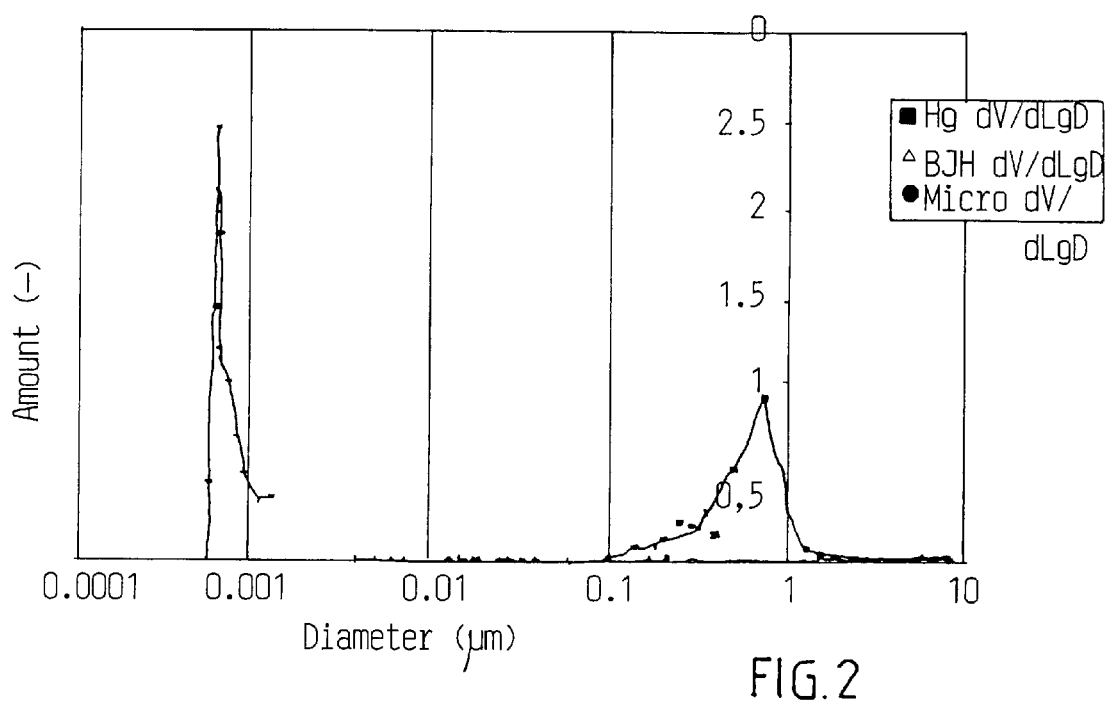
FIG. 2 is a graph of the pore size distribution of SNC(TiC)
Figure 3:
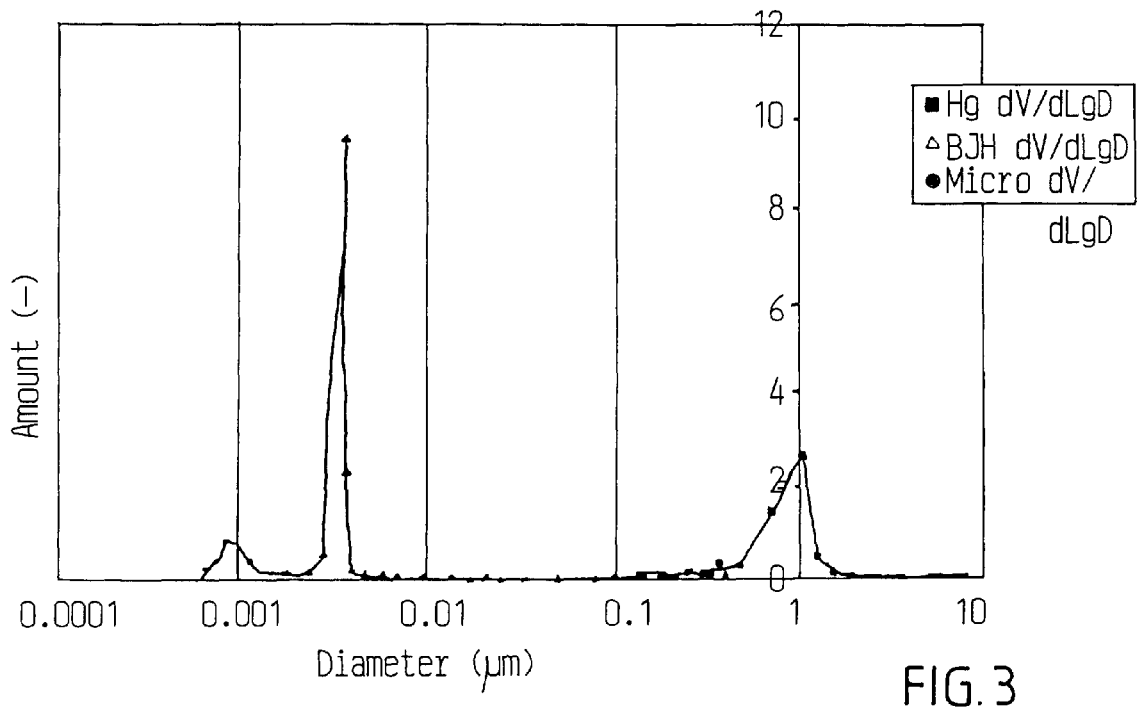
FIG. 3 is a graph of the pore size distibution of SNC (Mo$_2$C)
Figure 4:
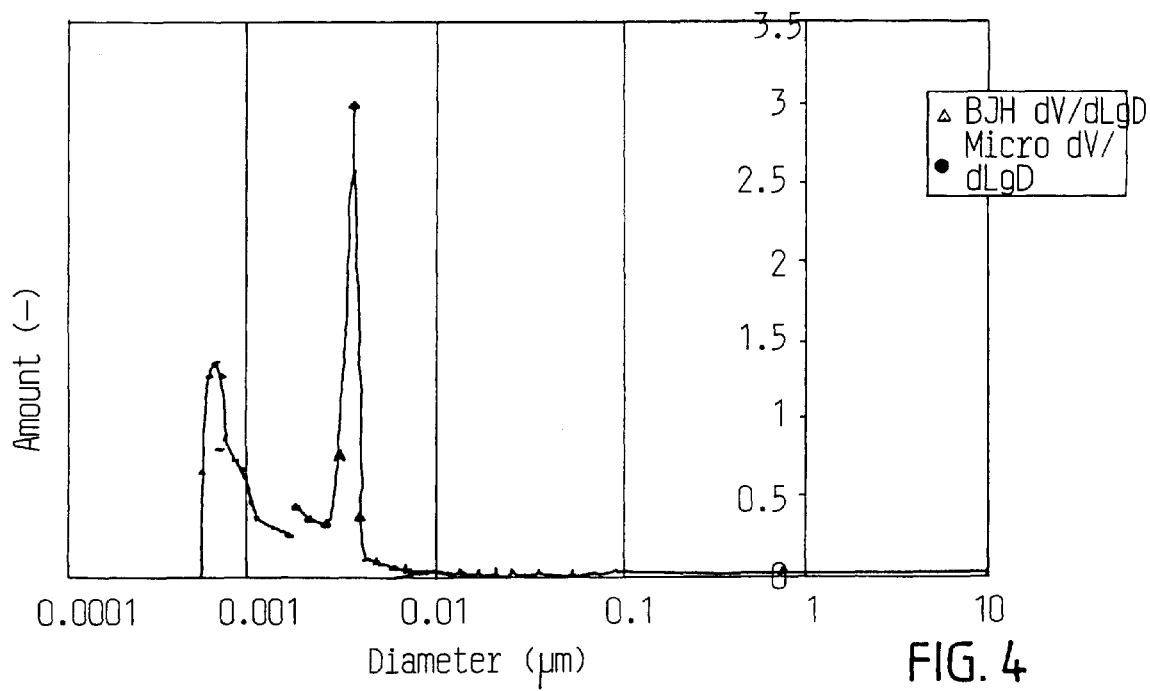
FIG. 4 is a graph of the pore size distribution of SNC ((MoTi)Cx)

FIGS. 2 to 4 show the pore distribution for TiC—, Mo$_2$C— and sintered (TiMo)Cx— derived carbon respectively.

According to one aspect of the present invention, carbon containing compounds based on the following metals, or metalloids or combinations thereof, are preferred be used: Ti, Zr, Hf, V, Nb, Ta, Mo, W, Cr, Fe, Al, Si, B, and Ca.

The size of the particles of the carbon precursor should preferably be less than about 100 microns to provide good conditions for halogenation throughout the particles. In most carbides, a particle size of less than about 10 microns is advantageous to avoid overheating inside the particles, which during chlorination increases the amount of undesirable graphitic clusters and closed porosity. Halogenation can be made with all halogens, but Cl$_2$ is preferred. In its simplest form a charge of TiC powder is placed in a tube furnace heated to a desired reaction temperature in the flow of inert gas. Thereupon $Cl_2$ gas is passed through the powder mass and allowed to react until all Titanium is removed from the carbide. The mass balance of the reaction can be presented as:

$$TiC + 2Cl_2 \rightarrow TiCl_4 + C$$

The $TiCl_4$ being a vapor at the reaction temperature is swept away and condensed in a collector thus providing separation of the products of reaction.

In most cases the reaction of carbides with chlorine is exothermic and can increase the local temperature within the powder mass. The actual reaction temperature affects the nanoscale structure of the carbon product and has to be kept below the temperature of graphitization. For instance, in the case of TiC as precursor material, 900–1000° C. is preferred. Thus it is preferred to carry out chlorination under conditions of near uniform heat transfer, such as in a fluidized bed or a rotary kiln reactor. Carbides that form gaseous chlorine are preferred because their chlorides are vapors. The carbon product is subsequently heat treated at 900–1100° C. in the atmosphere of inert gas such as Argon or Helium to remove the excess of chlorine adsorbed in pores (dechlorination). Removal of any undesired residual chlorine including chemically bound is done by additional heat treatment in preferably $H_2$ atmosphere at 600–900° C. Diluted $H_2O$ vapor at 800–1000° C. using inert carrier gas, e.g. Argon, also works.

Even though the above method of manufacturing nanoporous carbon gives good control of the size and size distribution of nanopores in the resulting particles, some additional refinement of the controllability is desirable. The match of nanopores size and ion size under a given set of circumstances, such as different size of cations and anions and their diffusive mobility inside the pores, is important; the pores should not be too small or they will not be entered by the ions or if the fit is too close, the mobility of the ions will be impeded.

On the other hand, if the nanopores are unnecessarily large, the specific surface of the carbon material suffers. Certain carbide precursors are more expensive than others and the carbon yield from the process also differs. For economic reasons as well as from functional, it is advantageous to apply a nanopores modification process of the carbon realized by halogenation of the precusor material. This is done by essentially known methods such as exposing at elevated temperature the nanoporous carbon to an oxidizing medium which may consist of $H_2O$ carried by an inert gas, carbon dioxide, concentrated nitric or sulphuric acid or other oxidizing agents. The effects are controllable widening of the nanopores and removal of physically and chemically absorbed chlorine. In most cases it is preferable to use such modified nanostuctured carbon for at least one of the electrodes in a electric double layer capacitor. FIG. 5 shows the effect on TiC derived carbon of such modification. Table 1 shows the effect of halogenated SiC, subsequently modified by $HNO_3$. Table 2 shows electrochemical effects of modification of SiC and TiC derived carbon. Table 3 illustrates material properties of a number of modified carbon materials from various precursors.

TABLE 1

Pore Structure Parameters for SNC (SiC) powder modified by $HNO_3$

| Cycle number | Surface area S, $m^2/g^a$ | Pore volume Vp, ccm/g | Pore size[b] X*, nm (calculation) |
|---|---|---|---|
| initial powder | 1330 | 0.49 | 0.74 |
| 1 | 1420 | 0.55 | 0.78 |
| 2 | 1320 | 0.58 | 0.88 |
| 3 | 1260 | 0.65 | 1.03 |
| 4 | 1240 | 0.65 | 1.04 |

[a]One-point measurement of surface area by nitrogen
[b]Note: Pore size X = 2Vp/S

TABLE 2

Electrochemical comparison of non-modified and modified SNC materials

| SNC precursor | Type of SNC | $S_{a,BET}$ [$m^2 g^{-1}$] powder | $S_{a,BET}$ [$m^2 g^{-1}$] electrode | Specific Capacitance [F g$^{-1}$]* DC = −1.4 V | Specific Capacitance [F g$^{-1}$]* DC = −1.4 V |
|---|---|---|---|---|---|
| SiC | Non-modified | 1086 | 931 | 5.8 | 79.9 |
|  | Modified ($H_2O$) | 2140 | 1567 | 92.8 | 88.1 |
| TiC | Non-modified | 1485 | 1054 | 80.5 | 113.4 |
|  | Modified ($H_2O$) | 2232 | 1639 | 111.2 | 142.5 |

*Measured in 1.5 M TEA solution in acetonitrile using 3-electrode cell with a saturated calomel (SCE) reference electrode

TABLE 3

Examples of material properties of modified nanostructured carbon from different precursors.

| SSC # | Precursor carbide | $T_{chlor}$ ° C. | Post-treatment agents | $S_a$(BET) $m^2/g$ | $V_{p(total)}$ $cm^3/g$ | $V_{p(nano)}$ $cm^3/g$ | $W_s$ ($C_6H_6$) $cm^3/g$ | $C(+)^a$ F/g | $C(-)^a$ F/g |
|---|---|---|---|---|---|---|---|---|---|
| 1 | TiC | 950 | $H_2$ | 1500 | 0.74 | 0.60 | 0.66 | 113 | 98 |
| 2 | $Mo_2C$ | 750 | $H_2$ | 2138 | 1.59 | 0.16 | 1.44 | 111 | 105 |
| 3 | $B_4C$ | 1100 | — | 1231 | 0.71 | 0.23 | 0.81 | 77 | 71 |
| 4 | TiC | 950 | $H_2/H_2O$ | 2237 | 1.23 | 0.61 | 1.11 | 116 | 110 |

TABLE 3-continued

Examples of material properties of modified nanostructured carbon from different precursors.

| SSC # | Precursor carbide | $T_{chlor}$ °C. | Post-treatment agents | $S_a$(BET) m²/g | $V_{p(total)}$ cm³/g | $V_{p(nano)}$ cm³/g | $W_s$ ($C_6H_6$) cm³/g | $C(+)^a$ F/g | $C(-)^a$ F/g |
|---|---|---|---|---|---|---|---|---|---|
| 5 | SiC | 1150 | $H_2/H_2O$ | 1696 | 0.90 | 0.61 | 0.81 | 116 | 95 |
| 6 | $Al_4C_3$ | 400 | — | 1204 | 0.81 | 0.55 | 0.63 | 104 | 91 |

[a] Measured in 1.5 M TEA solution in acetonitrile using 3-electrode cell with a saturated calomel electrode as a reference.

In another embodiment it is also possible to react $TiCl_4$ with a suitable carbon source such as $CH_4$ to recycle the $TiCl_4$ back to TiC.

Titanium carbide may also be made by the reaction at high temperature of titanium with carbon; titanium tetrachloride with organic compounds such as methane, chloroform, or poly(vinyl chloride); titanium disulfide with carbon; organotitanates with carbon precursor polymers and titanium tetrachloride with hydrogen and carbon monoxide. The reaction of titanium tetrachloride with a hydrocarbon-hydrogen mixture at 1000° C. has been used in the prior art for the chemical vapor deposition (CVD) of thin carbide films used in wear-resistant coatings.

The SNC materials produced as described above are combined in a form suitable for use as a thin, flat, flexible electrode containing high fractions of the SNC. Theoretical models developed by the inventors predict that the porous carbon electrodes should be essentially thin to provide the high power output. Estimations show the optimum thickness to be in the range of about 5–150 micron. Besides, one should bear in mind that electrodes must not be brittle since they are normally pressed when assembling the electrode pack in order to reduce the equivalent series resistance of a capacitor device.

According to the present invention, fabrication of composite electrodes of certain thickness may be accomplished by rolling a plasticized mixture of SNC powder, one or more binders and certain solvents, said plasticized mixture being made as a stiff putty like mass with the help of the certain solvents.

Optional additives to the SNC carbon powder are colloidal or Thermally Expanded Graphite(TEG) (1–15% wt. of the dry mass) to increase conductivity, conductive polymers (2–20% wt. of the dry mass.) also to increase conductivity and $SiO_2$ (0.5–10% wt. of the dry mass) that increases capacitance.

After investigation of different types of compounds, which might be used as binders, fluorine-containing polymers, e.g. PTFE(Teflon) or PVDF poly(vinylidene fluoride) were selected as a permanent binder that provides structural integrity. The selection was based on the fact that those compounds keep both their binding properties and chemical and electrochemical stability in electrolytes after the composite electrode material is thermally treated at temperatures below the decomposition temperature of such polymers. In addition the carbon electrodes fabricated by the method do not lose their mechanical strength even if the binder content does not exceed 2–10% by wt. of the carbon powder. This results in relatively high capacitance and low resistivity of the EDLC comprising such electrodes.

Another incorporated binder is temporary and serves to facilitate the formation of a ductile tape. It also raises the hydraulic component of the rolling force during the roll compaction (below) and limits the crushing force onto the carbon particles. The increased ductility enables rolling to thinner sections without unduly stiffening or hardening of the product. The ductility also enables cross rolling of the extruded material which develops a more isotropic distribution of Teflon fibers.

A requirement on this temporary binder is that it should be completely removable, at a temperature below the decomposition temperature of the permanent binder, without leaving any residues. This has the beneficial effect of leaving behind an improved transport porosity. One example of such temporary binder is polypropylene carbonate (PPC). The proportion of this temporary binder should be 4–10% wt. of the carbon, preferably 5–7% wt. Before mixing, the binder is added to a suitable solvent with the concentration of 7–18%, preferably 10%.

The solvent should have two advantageous characteristics. It should have low evaporation rate which means that the solvent content should change very slowly during material mixing and processing, resulting in better control and lot-to-lot reproducibility. Such solvents act as a plasticizer of the temporary binder and improves the working range of the tape. If it did not act this way, then the addition of a special plasticizer would be required. Plasticizers do not thermally decompose in a manner similar to that of e g PPC and at the low temperatures allowable would leave material behind. An additional requirement on the solvent is that it will evaporate completely, without leaving traces, along with the temporary binder. One such preferred solvent is N-Methyl Pyrrolidone (NMP). The solvent is first added to the dry mix together with the dissolved temporary binder. Additional amounts of solvent is added during the appropriate processing steps until a suitable consistency of the mass is reached. The precise amount of solvent to be added depends on the type of carbon used, particularly on its specific surface.

For instance carbon made as indicated earlier from TiC, without subsequent modification, requires that solvent be added until the ratio of the temporary binder to total solvent is 3–5%. Other carbon qualities may require a higher or somewhat lower ratio of temporary binder to total solvent content.

Although the method comprising extruding and rolling of thin and flexible carbon tapes by using binders such as PTFE is widespread, the present invention includes several improvements, that are necessary when considering the SNC powder according to the present invention, to obtain superior electrochemical characteristics for electric double layer capacitors.

Process for Manufacturing Flexible Carbon Tapes for Electrodes

The method of making flexible carbon tapes can be by hand but it is more advantageously carried out in a series of mechanized steps that lend enabling an integrated automated process.

The procedure for manufacturing flexible carbon tapes for electrodes includes the following steps in order of sequence:
Dry mixing
Wet mixing
Muller mixing
Grinding
Extrusion
Roll compaction
Heat treatment
Alternatively we may proceed by
Dry mixing
Wet mixing
Roll mixing (Rubber Mill Processing)
Roll compaction
Heat treatment Dry Mixing Applicable methods are tumbling, ball milling or stirring of chosen carbon powder, Teflon powder and optionally included additive as described above.

Wet Mixing

Wet mixing is a process to incorporate solvent such as NMP and a secondary binder such as PPC dissolved in a suitable solvent such as NMP. Wet mixing may be advantageously carried out in a planetary paddle mixer.

Muller Mixing

Mulling is a process that effectively mixes the solid and liquid ingredients and works the material into a soft, flexible mass. This operation is performed in a bowl holding the components to be mixed and a cylinder inside the bowl located so that its outside surface is pushed by a spring against the inside surface and bottom of the bowl. The material to be mixed is passed through the gap formed between the spring loaded cylinder and the bowl wall. The material is contained within the bowl and is cycled back to the input of the process automatically. Due to the pressure applied to the mixture during the mulling process, there is extrusion of the material in both axes as the material is folded back. This extrusion induces forces on the Teflon powder that stretch it into fiber form.

Grinding

Grinding is a process in which the product from the muller is fed into a system of rotating blades that cuts the material into small pieces suitable for feeding into an extruder. The previous mixing process may have entrapped air in pockets in the material. The grinding facilitates the removal of any such air when vacuum is applied to the extrusion hopper after loading the material into it.

Roll Mixing (Rubber Mill Processing)

This process is an alternative to mulling, grinding and extrusion to produce a belt preform suitable for roll compaction.

The step serves to further induce fiber formation of the Teflon portion of the binder system by stretching the Teflon particles. The equipment and process conventionally used for mixing rubber compounds is suited to this requirement. The equipment consists of a pair of rollers, placed horizontally side by side so that the passage of material between them will be vertical. The relative rotational speed of the rollers is set such that one roller turns faster than the other. The mixing is accomplished by passing the materials through the rollers and compressing it while simultaneously shearing it. This process is repeated until the material is thoroughly blended. In order to start the process, the materials must be roughly blended together so they will form a mass that can be placed into the rolls. At the end of the process, the product is collected as a single belt perform suitable for roll compaction.

Extrusion

Extrusion is performed to produce a ductile belt preform, typically <1 mm thick, suitable for roll compaction.

Roll Compaction

Roll compaction is a process in which a suitable ductile belt preform is fed between rolls rotating at the same speed with the gap or nip set so that the resulting tape is of the desired thickness, typically about 100 micrometers.

The rolling action is predominantly a shearing process that produces the tape without unduly compressing it. The physical properties of the tape are influenced by several factors including the diameter of the rolls, the rolling speed and the reduction in thickness per pass.

Heat Treatment

To remove without residual material traces the temporary binder and the solvent, the fabricated electrode is heat treated at a temperature that leaves the Teflon unaffected. The pyrolysis temperature for PPC is 250° C.

One preferred embodiment of the present invention provides an electric double layer capacitor (EDLC), which comprises thin and flexible polarizable SNC electrodes providing both low internal resistance and high capacitance at the same time. This is achieved by fabricating thin composite electrodes having the thickness in the range of about 5–150 microns and being stable mechanically, chemically and electrochemically in electrolytes over a long time. The electrodes comprise SNC carbon material as a powder, thermoexpanded graphite (TEG) as an additive, and a binder.

To fabricate electrodes in accordance with the present invention, nanoporous carbon materials produced by chlorinating titanium carbide, silicon carbide, molybdenum carbide, boron carbide, aluminum carbide or their combinations were used. These carbon materials possess a reasonably large specific area (1000–2500 $m^2/g$) including the notable contribution from the pores of about 0.7–3 nm in size that enables the ions from an electrolyte to enter the pores forming the electric double layer. The optimum carbon particle size in fabricated electrodes according to the present invention depends on the raw mass preparation method for the electrode sheet rolling but preferable are sizes not exceeding 10 micron. Powder having large grain size would cause poor mechanical strength of the composite electrodes. Drawback of particles exceeding 10 microns is also the increased resistivity of respective electrodes caused by the limited rate of diffusion of ions inside the particles.

Alternatively to the above method, a slurry of SNC carbon and other components as described above can be prepared, suitable for tape casting or slurry rolling to yield continuous flexible thin tapes. Tape casting could be made onto an aluminum foil or mesh so that this aluminum current collector can be directly incorporated into the electrode in a single manufacturing step.

To reduce the internal resistance of a EDLC device, in accordance with the present invention an aluminum layer of 2–5 microns thickness may be deposited on one side of composite electrodes by using an appropriate deposition method such as Plasma Activated Physical Vapor Deposition. The contact between the composite electrodes and aluminum foil or mesh (the current collector) is provided by pressing them together, by diffusion welding, spot or seam welding or laser welding.

Magnetic pulse welding or joining is another method with the advantage of being a "cold process".

All types of electrolytes used in electric double layer capacitors may be used for the present invention, water based (e g KOH, $H_2SO_4$) and organic. The non-aqueous electrolytic solution preferably comprises at least one salt selected from the group of tetrafluoroborates or hexafluorophosphates of tetraalkylammonium, tetrakis(dialkylamino) phosphonium, N,N-dialkyl-1,4-diazabicyclo[2.2.2]octanediium or their mixture, dissolved in an aprotic polar solvent or a mixture of such solvents selected from the group consisting of acetonitrile, propionitrile, benzonitrile, butyronitrile, 3-methoxypropionitrile, gamma-butyrolactone, -valerolactone, ethylene carbonate, propylene carbonate, N,N-dimethylformamide, 1-methyl-2-pyrrolidinone, dimethoxyethane, methyl ethyl ketone and tetrahydrofuran. The general requirement of useable electrolytes are the chemical and electrochemical stability and good performance over a wide temperature range. In order to avoid electrolyte depletion between the electrodes of the EDLC, the total salt concentration in the non-aqueous electrolyte is chosen in the range of 0.5–3 mol/l according to the present invention.

Organic electrolytes are widely used to increase voltage, and hence, specific performances of an electric double layer capacitor and are preferred for high energy applications. However, most of known electrolytes comprise cations and anions of different size. In many cases, large organic cations cannot enter small pores resulting in much lower capacitance of the negative electrode, and hence of the entire capacitor device. To provide an electric double layer capacitor, the present invention aims at using unsymmetrical polarizable electrodes in order to
increase both the capacitance and voltage of an electric double layer capacitor resulting in its higher specific energy and power.

Equalizing Leakage Current

Unit cells can be manufactured and selected so that their capacitance and inner resistance are practically equal along a stack of series connected EDCLs, however, it is rather difficult to equalize their leakage current. Even a small deviation in the leakage current value for various unit cells along the SC stack can cause a significant deviation from mean voltage value after keeping the charged stack for some time. In its turn, the disbalance in voltage can cause the decomposition of electrolyte in the cells charged up to a voltage higher than their rated voltage during further cycling the stack.

To improve a supercapacitor performance and to equalize the voltage of unit cells when they are assembled in a stack, some additives can be added to the electrolyte. As another embodiment, the present invention discloses a number of compounds, which undergo a fully reversible electrochemical reaction within a potential range not far from that wherein the impurities in the electrolyte start decomposing. Said compounds are chosen from aromatic series, the preferable compounds being twinned aromatic hydrocarbons (including heterosubstituted ones), aromatic nitrites, quinones and nitro- or amino-derivatives. Such combinations as nitronitriles (nitro-cyano derivatives) or cyanosubstituted quinones can also be used. All these compounds possess at least one reversible electrochemical wave either in anode or in cathode region (or in both regions), said electrochemical wave being located not far from the potential, at which the electrolyte decomposition starts. The concentration range wherein said additives are effective enough to influence the electrode potential and leakage current without deteriorating the performance of a supercapacitor device is between $1\times10^{-4}$ and $1\times10^{-1}$ mol/l, preferably between $1\times10^{-3}$ and $1\times10^{-2}$ mol/l. The electrochemical characteristics of some selected compounds are presented in Table 4.

TABLE 4

Electrochemical characteristics of some compounds selected as voltage equalizing additives

| No. | Compound | Anodic process $E_p$, V[a] | Cathodic process $E_p$, V[1] | $E_p$, mV |
|---|---|---|---|---|
| 1 | Anthracene | ≈0.9 | −2.21 | 60 |
| 2 | 1,2-Dicyanobenzene | — | −2.025 | 70 |
| 3 | 5-Nitro-1,2-dicyanobenzene | — | −1.09 | 60 |
|   |   |   | −1.685 | 90 |
| 4 | 1-Cyano-naphthalene | 1.75 | −2.34 | 60 |
| 5 | Anthraquinone | — | −1.18 | 80 |
|   |   |   | −2.83 | 60 |

[a]All potentials are given vs $Fc^+/Fc$ (540 mV vs $Ag^+/Ag$) at scan rate 5 mV/s.
Electrochemical window for 0.1M $Et_4NBF_4$ in AN lies within a range of −2.8 ÷ +2.2 V (0.5 mA/cm$^2$ was chosen as a limiting current density). Reduction of a water impurities starts at ca. −2.3 V.

The electric double layer capacitor includes a porous, ion-permeable, insulating material (separator) interposed between electrodes. It may be selected from the group of a nonwoven polypropylene or polyethylene separator films, a cellulose separator paper, a polyethylene terephthalate nuclear membrane; the separator thickness being about 5–100 micron, preferably 5–20 micron. The standard separator used in the art are PP based microporous separator films from Celgard GmbH (Germany).

Alternatively dielectric materials (such as $SiO_2$, SiCN or $Al_2O_3$) may be deposited as a thin film (of 0.1–3 microns) on the electrode surface. Our experiments show that sputtering a thin porous dielectric film improves both the mechanical properties and electrical performance of the composite electrodes.

Yet another method to provide a separator is to use a screenable paste permeable membrane compound formed from a silicon oxide aerosol carried in a PVDF/NMP paste. The dried film properties are controlled by the ratio of the $SiO2$ wt. to the resin wt. and the dried film thickness to the solvent percent.

In another aspect of the invention, balancing of the positive and negative electrodes is provided. One carbon was chosen for the anode and another for the cathode to match the sizes of the positive and negative ions of the electrolyte.

Of particular advantage, for a given electrolyte we estimate the sizes of the ions and then choose the appropriate carbon precursor and process parameters which gives us the SNC with the matching pore characteristics. FIG. 7 illustrates a variety of electrolytic salts suitable for use in the present invention. Sources of information about ions sizes are e g 1. Makoto Ue. J. Electrochem. Soc., (1994) vol. 141, No. 12, p. 3336
2. Makoto Ue. Electrochim. Acta, (1994) vol. 39, No. 13, p. 2083.

Both crystallographic data and MM2 calculations were used to estimate the ion size (van der Waals volume and radii) for a number of tetraalkylammonium cations as well as for some anions and solvent molecules.

For doubly-charged N,N-dialkyl-1,4-diazabicyclo[2.2.2]octanediium ($DEDACO^{2+}$) cation, the size was estimated by the inventors from the size of fragments included.

In one example, a positive polarizable electrode is made of nanoporous carbon material having an surface area of 1500 m$^2$/g according to BET measurements and a pore size of 0.5–1.5 nm preferably 0.5–1.0 nm. The negative polarizable electrode is made of carbon material having an average surface area of 2000 m$^2$/g and a pore size of 1.0–3.0 nm, preferably 1.0–2.0 nm.

In another aspect of the invention, a supercapacitor is provided where the specific capacitance of the cathode and the anode are different. If electrodes of the same size are used then the one having a lower capacitance, determines the cell as a whole by this lower capacitance level. To compensate for this we increase the volume (thickness) of the electrode (cathode) to raise the capacitance to that of the anode. The positive and negative capacitance need to be the same for most efficient energy storage.

In yet another aspect of the invention, a supercapacitor is provided where the positively and negatively charged electrodes in an electrode pair are balanced according to the zero-charge potential of the chosen electrode material. Balancing the electrodes with respect of the amount of stored charge considering the electrode's zero-charge potential and the applicable electrochemical window (i.e. the region of an ideal polarizability) increases the nominal voltage and electrochemical stability of a capacitor.

All supercapacitors contain three key components: electrodes, separator and electrolyte. It is the interdependent tuning of the properties of these elements that is necessary for and contribute to the high performance.

Design of the cell is important. If the electrode is thin, both the current collector and separator have to be thin. Balancing of dissimilar electrodes is very important and again hinges on our ability to tailor make the pore size by choosing the appropriate carbon precursor and on the processing and post processing operations. This feature also applies to the ability to match electrolyte ion size and pore size. A further important feature is to adjust the size of electrodes so that they deliver the same capacitance. The combination of these features gives the high performance of the supercapacitors of this invention.

The ability to control the nanopores size and its distribution is of course also beneficial for supercapacitors based on aqueous electrolyte systems (e g KOH, $H_2SO_4$). Table 5 shows that the capacitance in such a system can be influenced by choice of precursor material and thus the pore characteristics. Further refinement by modification of this nanoporosity offers optimization opportunities.

TABLE 5

Examples of influence on capacitance of choice of carbon precursors.

| # | SNC precursor | $W_s$ [cm$^3$g$^{-1}$] | $S_{a,BET}$ [m$^2$g$^{-1}$] | Capacitance* [F g$^{-1}$] |
|---|---|---|---|---|
| 1 | $Al_4C_3$ | 0.60 | 1353 | 251 |
| 2 | $B_4C$ | 0.78 | 1782 | 217 |
| 3 | $Mo_2C$ | 0.90 | 1873 | 223 |
| 4 | TiC | 0.73 | 1340 | 212 |
| 5 | SiC | 0.44 | 1059 | 209 |
| 6 | TiC/$Al_4C_3$, 3/1 (by wt.) | 0.58 | 1542 | 239 |
| 7 | $B_4C$/$Al_4C_3$, 3/1 (by wt.) | 0.67 | 1614 | 239 |
| 8 | $B_4C$/$Al_4C_3$, 3/1 (by wt.) | 0.58 | 1572 | 219 |
| 9 | $B_4C$/$Al_4C_3$, 3/1 (by wt.) | 0.53 | 1440 | 211 |

*Measured in aqueous 6M KOH solution at DC = −1 V and AC = 5 mV using 3-electrode cell with Hg/HgO reference electrode The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

EXAMPLE 1

Preparation of Carbon From TiC in Rotary Kiln Reactor

Titanium carbide (H. C. Starck, grade C.A., 300 g) with an average particle size of 1.3–3 microns was loaded into the silica rotary kiln reactor and let to react with a flow of chlorine gas (99.999% assay) for 4 h in a tube furnace at 950° C. Flow rate of chlorine gas was 1.6 l/min and rotation speed of reactor tube was ~2.5 rpm. The by-product, $TiCl_4$, was led away by the stream of the excess chlorine and passed through the water-cooled condenser into the collector. After that the reactor was flushed with the Argon (0.5 l/min) at 1000° C. for 0.5 h to remove the excess of chlorine and residues of a gaseous by-products from carbon. During heating and cooling, the reactor was flushed with a slow stream (0.5 l/min) of argon. Resulting carbon powder (47.6 g) was moved into silica stationary bed reactor and treated with hydrogen gas at 800° C. for 2.5 h. During heating and cooling, the reactor was flushed with a slow stream of Helium (0.3 l/min). Final yield of the carbon material was 45.6 g (75.9% from theoretical).

EXAMPLE 2

Preparation of Carbon From TiC in Fluidized Bed Reactor

Titanium carbide (Pacific Particulate Materials, 1.0 kg) with an average particle size of 70 microns was loaded into the silica fluidised bed reactor and let to react with a flow of chlorine gas (99.999% assay) for 4 h at 950° C. Flow rate of chlorine gas was 7.5 l/min. The by-product, $TiCl_4$, was led away by the stream of the excess chlorine and passed through the water-cooled condenser into the collector. After that the reactor was flushed with the Argon (6 l/min) at 1000° C. for 0.5 h to remove the excess of chlorine and residues of a gaseous by-products from carbon. During heating and cooling, the reactor was flushed with a slow stream (0.5 l/min) of argon. Final yield of the carbon material was 190 g (95% from theoretical).

EXAMPLE 3

Preparation of Carbon From $Mo_2C$ in Stationary Bed Reactor

Molybdenum carbide (Donetsk Chemical Reagent Plant JSC, Ukraine, Lot TY6-09-03-363-78, particle size <40 micron, 100 g) The molybden carbide was loaded into the silica stationary bed reactor and allowed to react with a flow of chlorine gas (99.999% assay) for 80 min. in a tube furnace at 750° C. Flow rate of chlorine gas was 1.6 l/min. The by-product, mixture of molybdenum chlorides, was led away by the stream of the excess chlorine and passed through the water-cooled condenser into the collector. After that the reactor was flushed with the Argon (0.5 l/min) at 1000° C. for 0.5 h to remove the excess of chlorine and residues of a gaseous by-products from carbon. During heating and cooling, the reactor was flushed with a slow stream of argon. Resulting carbon powder (4.9 g) was moved into silica stationary bed reactor and treated with hydrogen gas at 800° C. for 1 h. During heating and cooling, the reactor was flushed with a slow stream of helium (~0.3 l/min). Final yield of the carbon material was 4.6 g (78% from theoretical).

EXAMPLE 4
Modification of SNC of Example 1 in Stationary Bed Reactor and Fluidized Bed Reactor A carbon powder of Example 1 (25 g) was placed in a quartz reaction vessel and loaded into horizontal quartz reactor heated by the tube furnace. Thereupon the reactor was flushed with argon to remove air and the furnace was heated up to 900° C. using a heat-up gradient of 15°/min. The argon flow was then passed with a flow rate of 0.8 l/min through the distilled water heated up to 75–80° C. and the resultant argon/water vapor mixture with approximate ratio of 10/9 by volume was let to interact with a carbon at 900° C. for 2.5 h. After that the reactor was flushed with argon for one more hour at 900° C. to complete the activation of a carbon surface and then slowly cooled to room temperature. The yield of a modified carbon was 15.8 g.

EXAMPLE 5
Preparation of Carbon From SiC in Rotary Kiln Reactor with Subsequent Modification in a Stationary Bed Silicon carbide (H. C. Starck, lot 3481, particle size <10 micron, 100 g) was loaded into the silica rotary kiln reactor and allowed to react with a flow of chlorine gas (99.999% assay) for 1 h in a tube furnace at 1150° C. Flow rate of chlorine gas was 1.5 l/min and rotation speed of reactor tube was ~2.5 rpm. The by-product, $SiCl_4$, was led away by the stream of the excess chlorine and passed through the water-cooled condenser into the collector. After that the reactor was flushed with the Argon (0.5 l/min) at 1150° C. for 0.5 h to remove the excess of chlorine and residues of a gaseous by-products from carbon. During heating and cooling, the reactor was flushed with a slow stream (0.5 l/min) of argon. Resulting carbon powder (29.9 g) was moved into silica stationary bed reactor and treated with hydrogen gas at 800° C. for 2 h. During heating and cooling, the reactor was flushed with a slow stream of helium (~0.3 l/min). The yield of the carbon material was 28.7 g (95.6% from theoretical). Part of a carbon powder (15 g) obtained was placed in a quartz reaction vessel and loaded into horizontal quartz reactor heated by the tube furnace. Thereupon the reactor was flushed with argon to remove air and the furnace was heated up to 900° C. using a heat-up gradient of 15°/min. The argon flow was then passed with a flow rate of 0.8 L/min through the distilled water heated up to 75–80° C. and the resultant argon/water vapor mixture with approximate ratio of 10/9 by volume was let to interact with a carbon at 900° C. for 2.5 h. After that the reactor was flushed with argon for one more hour at 900° C. to complete the modification of a carbon surface and then slowly cooled to room temperature.

EXAMPLE 6
Experimenetal Laboratory Preparation of Electrode

A mixture including 86% wt of SNC powder of Example 1 and 8% wt of TEG was stirred in ethanol for 10 minutes. After that 6% wt of PTFE (as a suspension in water) was added to this slurry preliminary cooled to 15° C., stirred for 30 minutes and gently pressed until the wet "pancake" was formed. Thereupon the ethanol was evaporated at elevated temperature (~95° C.). This pancake was then impregnated with heptane, shaped to a cylinder and extruded by rolling the body in direction of the ends of a cylinder. The latter procedure was repeated until the elastic properties appeared. Finally the heptane was removed at ~75°, the extruded cake rolled stepwise down to thickness of 98±4 microns, dried in vacuum at 270° C. and covered from one side with an aluminum layer of 4±1 μm using Plasma Activated Physical Vapor Deposition.

EXAMPLES 7–10
Further Electrodes Preparation

Polarizable electrodes were made in the same manner as in example 6 except that SNC powder from Examples 2–5 was used, respectively. Carbon powder with particle sizes >10 micron were reduced by ball milling. The electrode sheets were prepared with a thickness of 98±4, 125±5, 125±5 and 125±5 microns for the SNC of examples 2, 3, 4 and 5, respectively.

Assembling and Preconditioning of Capacitors From the Electrode of Examples 6–10

The electrodes as prepared according examples 6–10 were attached by methods indicated in TABLE 5 to Al foil of 10 microns thick (current collector) and interleaved with a separator. A Celgard separator was used in the present examples The electrode pairs from positively and negatively charged polarizable electrodes made as disclosed in Examples 6–10, were connected in parallel. The electrode pack thus prepared was placed in a sealed box, kept under vacuum for three days to remove all the gases absorbed and then impregnated with electrolyte comprising solution of a single quaternary ammonium salt or a mixture of such in acetonitrile. The EDLC cells thus fabricated were cycled within the voltage range of 1.5–3.0 V under constant current or constant power conditions.

Certain of the results obtained are shown in Tables 6 and 7: The applicability of different methods to connect the carbonaceous electrode sheet to the aluminum foil is presented in Table 6 and the effect of balancing the positively and negatively charged polarizable electrodes is presented in Table 7.

TABLE 6[a]

Results of different methods of connecting an aluminum current collector to a carbonaceous electrode sheet.

| SNC used in +/− electrodes | Type of connection between the electrode and the current collector | Electrodes thickness (+/−) | Resistance [$\Omega cm^2$] | Volumetric Resistance (active volume)[b] [$\Omega cm^3$] | Capacitance (Per active weight)[b] [$F\ g^{-1}$] | Capacitance (Per active volume)[b] [$F\ cm^{-3}$] |
|---|---|---|---|---|---|---|
| C(TiC)/C(TiC)-modified | Electrode/Al foil (arc spot weld) | 100/120 | 0.87 | 0.037 | 6.7 | 9.1 |
| C(TiC)/C($Mo_2C$) | Electrode/Al foil (diffusion weld) | 102/120 | 0.60 | 0.023 | 6.7 | 9.7 |
| C(TiC)/C(TiC)-modified | Electrode/Al foil (pressure contact) | 95/130 | 0.69 | 0.025 | 6.9 | 10.7 |
| C(TiC)/C(TiC)-modified | Electrode/Al foil (laser spot-weld) | 100/130 | 0.68 | 0.027 | 6.7 | 10.0 |

[a]The separator Celgard 2400 was used.
[b]Weight and volume of carbon compound, electrolyte, separator and current collector.

TABLE 7

Examples of the effect of balancing positively and negatively charges polarizable electrodes

| SNC used in +/− electrodes | Resistance [Ωcm²] | Volumetric Resistance (active volume) [Ωcm³] | Capacitance (Per active weight)[a] [F g⁻¹] | Capacitance (Per active volume)[a] [F cm⁻³] | Separator | Electrolyte salt | $C_{salt}$ [M] | Electrod Thickness +/− |
|---|---|---|---|---|---|---|---|---|
| C(Mo₂C)/ C(Mo₂C) | 0.42 | 0.017 | 4.2 | 6.7 | Celgard 277 | Et₄NBF₄ | 1.5 | 130/130 |
| C(TiC)/ C(TiC)-modified | 0.29 | 0.010 | 7.8 | 12.2 | Celgard 277 | Et₄NBF₄ | 1.5 | 105/135 |
| C(TiC)/ C(Mo₂C) | 0.38 | 0.014 | 6.0 | 9.4 | Celgard 277 | Et₄NBF₄/ Et₂Me₂NBF₄ | 0.745/ 0.846 | 98/128 |
| C(TiC)/ C(TiC) | 0.47 | 0.015 | 6.9 | 9.0 | Celgard 2400 | Et₄NBF₄ | 1.5 | 140/140 |
| C(B₄C)/ C(B₄C) | 0.61 | 0.018 | 5.2 | 6.8 | Celgard 2400 | Et₄NBF₄ | 1.5 | 115/115 |

[a]Weight and volume of carbon compound, electrolyte, separator and current collector The examples of capacitor prototypes and their electrochemical performance illustrating the object of this invention are presented in Table 8 and FIG. 6.

TABLE 8

Examples of electrochemical performance of prototype electric double layer capacitors according to the present invention.

| # | Electrolyte | Capacitance [F] | Resistance [mΩ] | Specific capacitance [F g⁻¹] | [F cm⁻³] | Specific resistance [Ωcm²] | [Ωcm³] |
|---|---|---|---|---|---|---|---|
| 1 | 1.5 M TEA/AN | 630 | 0.56 | 7.39 | 9.63 | 0.87 | 0.037 |
| 2 | 0.75 M TEA + 0.75 M TEMA/AN | 663 | 0.68 | 7.47 | 9.93 | 1.16 | 0.045 |
| 3 | 1.0 M TEA/AN | 631 | 0.54 | 7.35 | 9.54 | 0.84 | 0.036 |

Characterization of SNC Materials According to this Invention

The low temperature nitrogen sorption experiments were performed at the boiling temperature of nitrogen (−196° C.) using Gemini Sorptometer 2375 (Micromeritics). The specific surface area of carbon materials was calculated according BET theory up to the nitrogen relative pressure ($p/p_0$) of 0.2, with the exception for results reported in Table 1. The volume of micro-pores was calculated from the t-plot of adsorption isotherm and the pore size distribution according to BJH (Barrett-Joyner-Halenda) theory. Adsorption dynamics of benzene vapours was studied at room temperature using the computer controlled weighing of the carbon samples in benzene vapours at normal pressure and room temperature. A volume of the pores that adsorbed benzene in above-described conditions, was calculated according the equation $$W_s = (m_2 - m_1)/m_1 \times d_{C_6H_6} [cm^3 \, g^{-1}]$$

where $m_1$ and $m_2$ are the initial and final weights of the test-sample, respectively, and $d_{C_6H_6}$ is the density of benzene at room temperature.

Electrochemical Evaluation of SNC Materials

The electrochemical tests were performed in the 3-electrode electrochemical cell, using the Solartron potentiostat 1287 with FRA analyzer. Electrochemical experiments were done in aqueous, 6M KOH and non-aqueous 1.5M Tetraethylammoniumtetrafluoroborate (TEA) in Acetonitrile (AN) electrolyte. During experiments the electrolyte was degassed with Ar gas.

Three types of experiments using: constant voltage (CV), constant current (CC), and impedance (EIS) technique were used. The region of the ideal polarizabilty was observed between −1.5 to +1.5 V (vs. SCE) and −1.0 to +0.25 V (vs. Hg/HgO) for non-aqueous and for aqueous systems, respectively. Discharge capacitance for the negatively and positively charged electrode materials were calculated from the CV and CC plots. The EIS measurements were carried out at constant DC potentials: −1.4 V, +1.4 V for non-aqueous and −1.0 V, in aqueous electrolytes. The EIS capacitance was calculated at frequency 10 mHz.

Evaluation of Supercapacitors

The constant current (CC) and constant voltage (CV) tests were carried out using the potentiostat Solartron 1287. The nominal voltage of capacitors was estimated from the CV plots. The capacitance of the supercapacitors was calculated from CC plots according to formula: C=Idt/dE. Internal resistance was derived from the IR-drop.

The power, energy performance and respective Ragone plots were characterised, using constant power (CP) charge-discharge cycling regimes.

Electrochemical impedance spectroscopy (EIS) was used to determine series capacitance and series resistance at frequencies 10 mHz and 100 Hz, respectively.

In summary, the present invention provides superior supercapacitor performance. Specifically, our SNC has a combination of high specific surface area and narrow pore size distribution in a high packing density of the electrode, which is better than any other known carbon. This allows the making of very thin electrodes, which provide the low resistance and the high power of the device, while still maintaining high specific energy. Balancing the electrochemical performance of positively and negatively charged electrodes by varying their composition and volume, in accordance with the objective of the present invention, is also a key feature of the method for manufacturing the EDLC proposed.

What is claimed is:

1. A method of manufacturing carbon particles with a predetermined pore size, characterized by a step of halogenation of particles of an inorganic carbon containing compound, whereby nanopores of a given size are created in carbon particles remaining after halogenation, and selecting the inorganic carbon containing compound so that the nanopores in said carbon particles have a size that is somewhat smaller than or equal to the predetermined pore size, and, if needed, by the further step of treating said carbon particles in an oxidizing medium until the nanopores size in said carbon particles correspond to the predetermined pore size.

2. The method according to claim 1, characterized in that the halogenation is performed in a fluidized bed or in a rotary kiln reactor.

3. The method according to claim 1, characterized in that $H_2O$, $HNO_3$, $H_2SO_4$, HCl, NaOCl or $CO_2$ is used to oxidize the carbon particles remaining after halogenation.

4. A method of manufacturing an electrode for an electric double layer capacitor, comprising the steps of:

mixing a mixture comprising carbon particles having nanopores with a predetermined size, at least a primary binder and a secondary binder and a solvent;

extruding the mixture;

rolling the extruded mixture into sheet shape by roll compaction producing a formed electrode sheet;

attaching the formed electrode sheet to a conductive foil or mesh; and removing the solvent and the secondary binder from the formed electrode sheet by heat treatment, the secondary binder being removable from the formed electrode sheet at a temperature below the decomposition temperature of the first binder, wherein the first binder consists of 2–10 wt % of particles of polytetrafluorethylene or polyvinylidene fluoride and in that the mixing is performed so that the particles of polytetrafluorethylene or polyvinylidene fluoride are pulled into filaments.

5. A method of manufacturing an electrode for an electric double layer capacitor, comprising the steps of:

mixing a mixture comprising carbon particles having nanopores with a predetermined size, at least a primary binder and a secondary binder and a solvent;

extruding the mixture;

rolling the extruded mixture into sheer shape by roll compaction producing a formed electrode sheet;

attaching the formed electrode sheet to a conductive foil or mesh; and removing the solvent and the secondary binder from the formed electrode sheet by heat treatment, the secondary binder being removable from the formed electrode sheet at a temperature below the decomposition temperature of the first binder, wherein the second binder has the ability to facilitate the formation of a ductile tape and raise an hydraulic component of rolling force and is removable at a temperature below the decomposition of the first binder.

6. The method according to claims 5, wherein 5–15 wt % of polypropylene carbonate dissolved in the solvent is used as a secondary binder.

7. The method according to claim 6, wherein the heat treatment is at a temperature of about 250° C. so that the polypropylene carbonate is pyrolysed.

8. A method of manufacturing an electrode for an electric double layer capacitor, comprising the steps of:

mixing a mixture comprising carbon particles having nanopores with a predetermined size, at least a primary binder and a secondary binder and a solvent;

extruding the mixture;

rolling the extruded mixture into sheet shape by roll compaction producing a formed electrode sheet;

attaching the formed electrode sheet to a conductive foil or mesh; and removing the solvent and the secondary binder from the formed electrode sheet by heat treatment, the secondary binder being removable from the formed electrode sheet at a temperature below the decomposition temperature of the first binder, wherein the solvent has a low evaporation rate and the ability of plasticizing the secondary binder and is removable at a temperature not exceeding an temperature at which the secondary binder is removable.

9. The method according to claim 8, wherein N-methyl pyrrolidone is the solvent.

10. A method of manufacturing an electrode for an electric double layer capacitor, comprising the steps of:

mixing a mixture comprising carbon particles having nanopores with a predetermined size, at least a primary binder and a secondary binder and a solvent;

extruding the mixture;

rolling the extruded mixture into sheet shape producing a formed electrode sheet; and attaching the formed electrode sheet to a conductive foil or mesh, wherein the mixture comprises 1–15 wt % of thermo-expanded graphite (TEG).

11. A method of manufacturing an electrode for an electric double layer capacitor, comprising the steps of:

mixing a mixture comprising carbon particles having nanopores with a predetermined size, at least a primary binder and a secondary binder and a solvent;

extruding the mixture;

rolling the extruded mixture into sheet shape producing a formed electrode sheet;

attaching the formed electrode sheet to a conductive foil or mesh; and attaching the formed electrode sheet to a conductive soil or mesh by pressing, diffusion welding, spot or seam welding or laser welding.

12. A method of manufacturing an electrode for an electric double layer capacitor, comprising the steps of:

mixing a mixture comprising carbon particles having nanopores with a predetermined size, at least a primary binder and a secondary binder and a solvent;

extruding the mixture;

rolling the extruded mixture into sheet shape producing a formed electrode sheet;

attaching the formed electrode sheet to a conductive foil or mesh; and depositing a thin film of a dielectric material on each electrode on the side opposite to the side to which the conductive foil or mesh is attached.

13. The method according to claim 12, wherein the depositing step comprises the steps of depositing silicon oxide aerosol carried in a paste of PVDF/NMP on each electrode on the side opposite to the side to which the conductive foil or mesh is attached by screening and drying the paste into a film.

* * * * *